United States Patent [19]
Hayashi et al.

[11] Patent Number: 6,020,411
[45] Date of Patent: Feb. 1, 2000

[54] FLAME RETARDANT RESIN COMPOSITION

[75] Inventors: Shoji Hayashi; Katsuhiro Horita, both of Kanagawa-Ken; Koji Ishihara, Tokyo-To, all of Japan

[73] Assignee: Nippon Unicar Company Limited, Tokyo, Japan

[21] Appl. No.: 09/052,829

[22] Filed: Mar. 31, 1998

[30] Foreign Application Priority Data

Apr. 9, 1997 [JP] Japan .................................. 9-106739

[51] Int. Cl.⁷ .............................. C08K 5/54; H01B 7/00
[52] U.S. Cl. ..................... 524/269; 524/268; 524/425; 524/451; 524/524; 524/528; 428/357; 428/375
[58] Field of Search ................................ 524/269, 268, 524/425, 451, 524, 528; 428/357, 375

[56] References Cited

U.S. PATENT DOCUMENTS

| | | | |
|---|---|---|---|
| 4,387,176 | 6/1983 | Frye | 524/268 |
| 4,536,529 | 8/1985 | Frye et al. | 524/284 |
| 4,722,959 | 2/1988 | Inoue et al. | 524/412 |
| 5,091,453 | 2/1992 | Davidson et al. | 524/269 |

FOREIGN PATENT DOCUMENTS

| | | |
|---|---|---|
| 0393959 | 10/1990 | European Pat. Off. . |
| 9625456 | 8/1996 | WIPO . |

*Primary Examiner*—Mark L. Warzel
*Attorney, Agent, or Firm*—Saul R. Bresch

[57] ABSTRACT

A composition comprising:

(i) a mixture of about 40 to about 80 percent by weight of a copolymer of ethylene and an alpha-olefin having a melt index in the range of about 0.1 to about 10 grams per 10 minutes and a density in the range of 0.870 to 0.930 gram per cubic centimeter and about 20 to about 60 percent by weight of a copolymer of ethylene and ethyl acrylate having a melt index in the range of about 0.1 to about 50 grams per 10 minutes and an ethyl acrylate content in the range of about 10 to about 40 percent by weight, and for each 100 parts by weight of said mixture, (ii) about 30 to about 150 parts by weight of a mixture of talc and calcium carbonate wherein the weight ratio of talc to calcium carbonate is in the range of about 0.3:1 to about 1.2:1; and (iii) about 1 to about 20 parts by weight of an organopolysiloxane having a kinematic viscosity in the range of about 0.06 to about 2 meters per second as measured at 23 degrees C.

8 Claims, No Drawings

FLAME RETARDANT RESIN COMPOSITION

TECHNICAL FIELD

This invention relates to flame retardant compositions useful in the preparation of wire and cable.

BACKGROUND INFORMATION

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary.

The requirements of these cables is that they exhibit exemplary flame retardancy, high and low temperature resistance, acid and oil resistance, mechanical strength, insulating and jacketing properties, processability, flexibility, and resistance to whitening, and do not emit toxic gases on burning.

A poly(vinyl chloride) resin composition has been used as a flame-retardant material in cable. However, the poly(vinyl chloride) resin composition generates a toxic halogen-containing gas when it burns, and contains heavy metals as stabilizing agents. In addition, poly(vinyl chloride) resin compositions contain plasticizers, which can bleed on the surface of the resin so that the surface of a shaped article obtained from the resin becomes sticky, and the feel of the shaped article becomes inferior. Further, the bleeding can spread to a shaped part adjacent to the shaped article. Bleeding also leads to a deterioration in oil resistance and printing properties.

Thus, it was desired to develop an improved flame retardant resin composition, which was free of the aforementioned problems. To this end, a polyolefin resin composition having aluminum hydroxide or magnesium hydroxide incorporated therein was proposed. It was found, however, that the cost of producing such a composition was rather high, and that the resin had various disadvantages such that, when it was molded into a shaped article, the shaped article expanded, the surface of the shaped article became rough, and the acid resistance of the shaped article became low. Further, in the presence of carbon dioxide and water, the shaped article suffered whitening on its surface due to a magnesium carbonate hydroxide reaction product; the appearance of the shaped article was not acceptable; and the arc resistance and the insulating and mechanical properties were impaired.

DISCLOSURE OF THE INVENTION

An object of this invention, therefore, is to provide a flame retardant composition, which, in cable form, avoids the problems associated with poly(vinyl chloride) resin compositions and the metal hydrate containing polyolefin compositions. Other objects and advantages will become apparent hereinafter.

According to the present invention, the above object is met by a composition comprising:

(i) a mixture of about 40 to about 80 percent by weigh of a copolymer of ethylene and an alpha-olefin having a melt index in the range of about 0.1 to about 10 grams per 10 minutes and a density in the range of 0.870 to 0.930 gram per cubic centimeter and about 20 to about 60 percent by weight of a copolymer of ethylene and ethyl acrylate or vinyl acetate having a melt index in the range of about 0.1 to about 50 grams per 10 minutes and an ethyl acrylate or vinyl acetate content in the range of about 10 to about 40 percent by weight, and for each 100 parts by weight of said mixture, (ii) about 30 to about 150 parts by weight of a mixture of talc and calcium carbonate wherein the weight ratio of talc to calcium carbonate is in the range of about 0.3:1 to about 1.2:1; and (iii) about 1 to about 20 parts by weight of an organopolysiloxane having a kinematic viscosity in the range of about 0.06 to about 2 meters per second as measured at 23 degrees C.

DESCRIPTION OF THE PREFERRED EMBODIMENT(S)

The copolymer of ethylene and an alpha-olefin employed in the present invention can be a copolymer of ethylene and an alpha-olefin having 3 to 12 carbon atoms. Useful alpha-olefins are exemplified by propylene, 1-butene, 1-hexene, 4-methyl-1-pentene, 1-octene, 1-decene, and 1-dodecene. The melt index of the copolymer can be in the range of about 0.1 to about 10 grams per 10 minutes. Throughout this disclosure, melt index is measured in accordance with JIS (Japanese Industrial Standard) K 7210. The density of the copolymer can be in the range of 0.870 to 0.930 gram per cubic centimeter. The density is measured in accordance with JIS K 7112.

The other copolymer used in the mixture of component (i) is a copolymer of ethylene and ethyl acrylate or a copolymer of ethylene and vinyl acetate. The copolymers have a melt index in the range of about 0.1 to about 50 grams per 10 minutes and an ethyl acrylate or vinyl acetate content in the range of about 10 to about 40 percent by weight.

The ethylene polymers useful in subject invention are preferably produced in the gas phase. The ethylene/alpha-olefin copolymers can also be produced in the liquid phase in solutions or slurries by conventional techniques, and are generally produced by low pressure processes. The ethylene/ethyl acrylate or vinyl acetate copolymer is generally produced by high pressure processes. Low pressure processes are typically run at pressures below 1000 psi whereas high pressure processes are typically run at pressures above 15,000 psi. Typical catalyst systems, which can be used to prepare polymers in low pressure processes, are magnesium/titanium based catalyst systems, which can be exemplified by the catalyst system described in U.S. Pat. No. 4,302,565; vanadium based catalyst systems such as those described in U.S. Pat. Nos. 4,508,842 and 5,332,793; 5,342,907; and 5,410,003; a chromium based catalyst system such as that described in U.S. Pat. No. 4,101,445; a metallocene catalyst system such as that described in U.S. Pat. Nos. 4,937,299 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polymers are also described in the aforementioned patents. A conventional high pressure process is described in Introduction to Polymer Chemistry, Stille, Wiley and Sons, New York, 1962, pages 149 to 151. In the high pressure process, organic peroxides can be used as free radical initiators in stirred autoclaves or tubular reactors.

The flame-retardant used in the composition of the present invention is the combination of calcium carbonate, talc, and an organopolysiloxane. There are two types of calcium carbonate and both can be used in the present invention. One is a natural type obtained by powdering the natural ore of calcium carbonate, and the other is a synthetic type obtained by burning lime stone followed by hydrating and carbonating. The average particle size of the calcium carbonate is desirably less than 10 microns from the viewpoint of dispersion, mechanical properties, and flame retardation. It is preferred to surface treat the calcium carbonate with, for example, fatty acids such as stearic, oleic, and palmitic acids or metal salts thereof, paraffin waxes (modified or unmodified), organosilanes, and organotitanates. Surface treating improves the flame retardant property.

The talc used in the present invention is preferably the one obtained by powdering a natural ore of talc. The chemical composition of the talc is $3MgO.4SiO_2.H_2O$ and its average particle size is desirably less than 10 microns from the viewpoint of dispersion, mechanical properties, and flame retardation. The talc is preferably surface treated in the same manner as the calcium carbonate. Again, surface treating improves the flame retardant property.

The total combined amount of talc and calcium carbonate can be in the range of about 30 to about 150 parts by weight for each 100 parts by weight of component (i). The ratio of talc to calcium carbonate can be about 0.3:1 to about 1.2:1.

The organopolysiloxane is commercially sold as silicone gum. The molecular construction of the organopolysiloxane can be linear chain, branched chain, ring, network, or cubic network. A linear chain structure is preferred. The linear chain organopolysiloxane can be represented by the following chemical formula: $R_3$—Si—$[R_2$—SiO$]_n$—$R_2$—SiO—R wherein each R is independently hydrogen, alkyl, aryl, vinyl, or hydroxy. Examples of the alkyl and aryl groups are methyl, ethyl, n-propyl, isopropyl, n-butyl, isobutyl, tertiary butyl, and phenyl, and n can be in the range of about 1500 to about 3000, but can be outside of this range if desired. The kinematic viscosity of the organopolysiloxane can be in the range of about 0.06 to about 2 meters per second measured at 23 degrees C. The organopolysiloxane can be present in the composition in an amount in the range of about 1 to about 20 parts by weight for each 100 parts by weight of component (i), i.e., the mixture of ethylene polymers.

The composition of this invention can be combined with conventional additives provided that the particular additive chosen will not adversely affect the composition. The additives can be added to the resin composition prior to or during the mixing of the components, or prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, fillers, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene (3,5-di-tert-butyl-4-hydroxyhydrocinnamate)]-methane, bis[(beta-(3,5-ditert-butyl-4-hydroxybenzyl)-methylcarboxyethyl)]sulphide, 4,4′-thiobis(2-methyl-6-tert-butylphenol), 4,4′-thiobis(2-tert-butyl-5-methylphenol), 2,2′-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The resins in the composition can be crosslinked in a conventional manner, if desired. Crosslinking is usually accomplished with an organic peroxide. The amount of crosslinking agent used can be in the range of about 0.5 to about 4 parts by weight of organic peroxide for each 100 parts by weight of resin, and is preferably in the range of about 1 to about 3 parts by weight. Crosslinking can also be effected with irradiation or moisture, or in a mold, according to known techniques. Crosslinking temperatures can be in the range of about 150 to about 250 degrees C and are preferably in the range of about 170 to about 210 degrees C.

The resins can also be made hydrolyzable so that they can be moisture cured. This is accomplished by grafting the resin with, for example, an alkenyl trialkoxy silane in the presence of an organic peroxide, which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those mentioned above for crosslinking.

The composition of the invention can be obtained by first blending the components and additives followed by heat kneading using a BANBURY™ mixer, a HENSCHEL™ mixer, a kneader, a multi-screw extruder, or continuous mixer to obtain a uniformly compounded composition.

The resin composition can be mixed and the cable coated with the resin composition can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1.

The advantages of the invention lie in excellent flame- and heat-resistance, mechanical properties superior to conventional products, good moldability, good low temperature performance, good insulating properties, good processability and flexibility, essentially no emission of harmful gases such as halogen, no carbon dioxide whitening, and good oil and acid resistance. Further, the flame retardants exhibit low expandability and are inexpensive. The composition is found to be useful in both wire and cable, and other molded products.

As noted, subject cable comprises one or more electrical conductors or communications media, or a core of two or more electrical conductors or communications media, each electrical conductor, communications medium, or core being surrounded by an insulating composition. The electrical conductors are generally copper and the communications media are generally fiber optics made of glass fibers. The term "cable" includes wires.

This specification is based on japanese patent application HEI9-106739 filed in Japan on Apr. 9, 1997 for which priority is claimed. The applicant is Nippon Unicar Company Limited and the inventors are Hayashi et al.

Molecular weights are weight average molecular weights unless otherwise noted.

Patents, patent application, and other publications mentioned in this specification are incorporated by reference herein.

The invention is illustrated by the following examples.

EXAMPLE 1 TO 15

The resin composition shown in the Table is heat-kneaded at 180 degrees C for 10 minutes in a Banbury™ mixer to form pellets. Sheets are obtained by means of subjecting these pellets to pressure at 15 Mpa and 160 degrees C for 3 minutes in a hot press machine. Various physical properties are measured according to following test conditions by using the above-mentioned pellets and sheets. The results are also set forth in the Table.

The organopolysiloxane used in these examples is a dimethyl polysiloxane having a kinematic viscosity of 1 meter per second, and in the above chemical formula is about 2,000.

(1) Melt Index is determined according to JIS K7210 at a load of 2.16 kilograms and a temperature of 190 degrees C.

(2) Flow Ratio=flow index divided by melt index. Flow index is determined according to JIS K7210 at a load of 21.6 kilograms and a temperature of 190 degrees C. The value of the Flow Ratio is an indication of the molecular weight distribution. The greater the value, the better the moldability of the resin composition.

(3) Tensile Strength and Elongation is determined according to JIS K6760 using a 1 millimeter thick sheet.

(4) Flame-retardant Test is performed according to JIS K7201 using a 1 millimeter thick sheet. The result of the test is indicated by Oxygen Index. The greater the value of Oxygen Index, the better the flame-retardant property.

(5) Heat Resistance: Test samples of dumb-bell shaped sheets, which are the same as those used for the Tensile Strength and Elongation test, are stored in an oven maintained at 115 degrees C for 24 hours and observed. No change is represented by A; partial elongation is represented by B; and melted sample is represented by C.

(6) Volume Resistivity is determined according to JIS K6723. Test samples having a width and length greater than 120 millimeters are punched from a 1 millimeter thick sheet. The test samples are charged with 500 volts direct electric current for one minute to measure the Volume Resistivity. The greater the value is, the better the electric insulation. Volume Resistivity=the value in the Table multiplied by $10^{11}$ ohms per centimeter.

From the results shown in the Table, it is clear that the results of the Examples are excellent in all test items except that there are one or more inferior test items in the results of examples 8 to 15, which are comparative examples.

Comparative example 8, which incorporates an amount of ethylene/alpha-olefin copolymer greater than the upper limit of this invention, is inferior in moldability as indicated by the Flow Ratio and the Oxygen index.

Comparative example 9, which incorporates an amount of ethylene/ethyl acrylate copolymer greater than the upper limit of this invention, and Comparative example 10, which incorporates an amount of ethylene/ethyl acrylate greater than that in Comparative example 9, are both inferior in Tensile Strength and Heat Resistance.

Comparative example 11, which incorporates an amount of calcium carbonate and talc lower than the lower limit of this invention, is inferior in Oxygen Index.

Comparative example 12, which incorporates an amount of calcium carbonate and talc greater than the upper limit of this invention, is inferior in Tensile Strength, Elongation, and Volume Resistivity.

Comparative example 13, which uses a ratio of talc to calcium carbonate outside of the ratio of this invention, is inferior in moldability as indicated by the Flow Ratio and the Oxygen Index.

Comparative example 14, which uses a ratio of talc to calcium carbonate to talc outside of the ratio of this invention, is inferior in Elongation, Oxygen Index, and Volume Resistivity.

Comparative example 15, which does not contain an organopolysiloxane, is inferior in Oxygen Index.

TABLE

| Example | 1 | 2 | 3 | 4 | 5 |
|---|---|---|---|---|---|
| components (parts by weight): | | | | | |
| ethylene/1-butene copolymer* | 40 | 60 | 80 | 60 | 60 |
| ethylene/ethyl acrylate copolymer** | 60 | 40 | 20 | 40 | 40 |
| calcium carbonate (APS = 1.3 microns) | 30 | 30 | 30 | 23 | 38 |
| talc (APS = 1.5 microns) | 20 | 20 | 20 | 27 | 12 |
| methyl polysiloxane (kinematic viscosity = 1 meter per second) | 5 | 5 | 5 | 5 | 5 |
| Results: | | | | | |
| Melt Index (g/10 min) | 0.7 | 0.5 | 0.6 | 0.5 | 0.5 |
| Flow Ratio | 86 | 75 | 55 | 100 | 74 |
| Tensile Strength (Mpa) | 17 | 20 | 24 | 21 | 20 |
| Elongation (%) | 700 | 700 | 740 | 740 | 740 |
| Oxygen Index | 28 | 28 | 26 | 26 | 26 |
| Heat Resistance | A | A | A | A | A |
| Volume Resistivity | 100 | 200 | 500 | 200 | 500 |

| Example | 6 | 7 | 8 | 9 | 10 |
|---|---|---|---|---|---|
| components (parts by weight): | | | | | |
| ethylene/1-butene copolymer* | 60 | 60 | 90 | 30 | 10 |
| ethylene/ethyl acrylate copolymer** | 40 | 40 | 10 | 70 | 90 |
| calcium carbonate (APS = 1.3 microns) | 60 | 20 | 30 | 30 | 30 |

TABLE-continued

| | | | | | |
|---|---|---|---|---|---|
| talc (APS = 1.5 microns) | 40 | 10 | 20 | 20 | 20 |
| methyl polysiloxane (kinematic viscosity = 1 meter per second) | 2 | 8 | 5 | 5 | 5 |
| Results: | | | | | |
| Melt Index (g/10 min) | 0.3 | 0.9 | 0.7 | 0.7 | 0.8 |
| Flow Ratio | 130 | 120 | 45 | 100 | 125 |
| Tensile Strength (Mpa) | 15 | 26 | 30 | 13 | 12 |
| Elongation (%) | 650 | 700 | 750 | 710 | 700 |
| Oxygen Index | 29 | 26 | 22 | 28 | 29 |
| Heat Resistance | A | A | A | B | C |
| Volume Resistivity | 70 | 5000 | 8000 | 100 | 80 |
| Example | 11 | 12 | 13 | 14 | 15 |
| components (parts by weight): | | | | | |
| ethylene/1-butene copolymer* | 60 | 60 | 60 | 60 | 60 |
| ethylene/ethyl acrylate copolymer** | 40 | 40 | 40 | 40 | 40 |
| calcium carbonate (APS = 1.3 microns) | 15 | 120 | 40 | 20 | 30 |
| talc (APS = 1.5 microns) | 5 | 80 | 10 | 30 | 20 |
| methyl polysiloxane (kinematic viscosity = 1 meter per second) | 8 | 2 | 5 | 5 | |
| Results: | | | | | |
| Melt Index (g/10 min) | 0.6 | 0.3 | 0.5 | 0.4 | 0.4 |
| Flow Ratio | 150 | 80 | 48 | 120 | 90 |
| Tensile Strength (Mpa) | 25 | 10 | 14 | 22 | 21 |
| Elongation (%) | 750 | 450 | 730 | 600 | 700 |
| Oxygen Index | 24 | 32 | 25 | 25 | 23 |
| Heat Resistance | A | A | A | A | A |
| Volume Resistivity | 8000 | 1 | 700 | 10 | 200 |

*Melt Index = 0.5 g/10 min; density = 0.910 g/cc
**Melt Index = 0.5 g/10 min; ethyl acrylate content = 23 wt %

We claim:

1. A composition comprising:
   (i) a mixture of about 40 to about 80 percent by weight of a copolymer of ethylene and an alpha-olefin having a melt index in the range of about 0.1 to about 10 grams per 10 minutes and a density in the range of 0.870 to 0.930 gram per cubic centimeter and about 20 to about 60 percent by weight of a copolymer of ethylene and ethyl acrylate or vinyl acetate having a melt index in the range of about 0.1 to about 50 grams per 10 minutes and an ethyl acrylate or vinyl acetate content in the range of about 10 to about 40 percent by weight, and for each 100 parts by weight of said mixture,
   (ii) about 30 to about 150 parts by weight of a mixture of talc and calcium carbonate wherein the weight ratio of talc to calcium carbonate is in the range of about 0.3:1 to about 1.2:1; and
   (iii) about 1 to about 20 parts by weight of an organopolysiloxane having a kinematic viscosity in the range of about 0.06 to about 2 meters per second as measured at 23 degrees C.

2. The composition defined in claim 1 wherein copolymer of ethylene and ethyl acrylate or vinyl acetate is a copolymer of ethylene and ethyl acrylate.

3. The composition defined in claim 1 wherein the copolymer of ethylene and ethyl acrylate or vinyl acetate is a copolymer of ethylene and vinyl acetate.

4. The composition defined in claim 1 wherein the organopolysiloxane is a methyl polysiloxane.

5. A cable comprising one or more electrical conductors or communications media, or a core of two or more electrical conductors or communications media, each electrical conductor, communications medium, or core being surrounded by a composition comprising:
   (i) a mixture of about 40 to about 80 percent by weight of a copolymer of ethylene and an alpha-olefin having a melt index in the range of about 0.1 to about 10 grams per 10 minutes and a density in the range of 0.870 to 0.930 gram per cubic centimeter and about 20 to about 60 percent by weight of a copolymer of ethylene and ethyl acrylate or vinyl acetate having a melt index in the range of about 0.1 to about 50 grams per 10 minutes and an ethyl acrylate or vinyl acetate content in the range of about 10 to about 40 percent by weight, and for each 100 parts by weight of said mixture,
   (ii) about 30 to about 150 parts by weight of a mixture of talc and calcium carbonate wherein the weight ratio of talc to calcium carbonate is in the range of about 0.3:1 to about 1.2:1; and
   (iii) about 1 to about 20 parts by weight of an organopolysiloxane having a kinematic viscosity in the range of about 0.06 to about 2 meters per second as measured at 23 degrees C.

6. The cable defined in claim 5 wherein copolymer of ethylene and ethyl acrylate or vinyl acetate is a copolymer of ethylene and ethyl acrylate.

7. The cable defined in claim 5 wherein the copolymer of ethylene and ethyl acrylate or vinyl acetate is a copolymer of ethylene and vinyl acetate.

8. The cable defined in claim 5 wherein the organopolysiloxane is a methyl polysiloxane.

* * * * *